(12) United States Patent
Hosur et al.

(10) Patent No.: US 9,247,276 B2
(45) Date of Patent: Jan. 26, 2016

(54) SYSTEM AND METHOD FOR PROGRESSIVE DELIVERY OF MEDIA CONTENT

(75) Inventors: Prabhudev I. Hosur, Austin, TX (US); Cuong T. Nguyen, Austin, TX (US); Jonathan R. Brickey, Austin, TX (US)

(73) Assignee: Imagine Communications Corp., Frisco, TX (US)

( * ) Notice: Subject to any disclaimer, the term of this patent is extended or adjusted under 35 U.S.C. 154(b) by 0 days.

(21) Appl. No.: 12/578,773

(22) Filed: Oct. 14, 2009

(65) Prior Publication Data

US 2010/0094931 A1     Apr. 15, 2010

Related U.S. Application Data (60) Provisional application No. 61/105,230, filed on Oct. 14, 2008.

(51) Int. Cl.
    *H04N 21/258*     (2011.01)
    *H04N 7/173*     (2011.01)
    *H04N 21/2343*     (2011.01)
    (Continued)

(52) U.S. Cl.
    CPC ..... *H04N 21/25808* (2013.01); *H04N 7/17318* (2013.01); *H04N 21/2343* (2013.01); *H04N 21/23611* (2013.01); *H04N 21/2662* (2013.01); *H04N 21/472* (2013.01); *H04N 21/6581* (2013.01); *H04L 51/066* (2013.01)

(58) Field of Classification Search
CPC .. H04L 12/5602; H04L 65/608; H04L 51/066
USPC .............................. 709/203, 231, 236; 707/10
See application file for complete search history.

(56) References Cited

U.S. PATENT DOCUMENTS

| 4,509,073 A | 4/1985 | Baran |
| 5,093,718 A | 3/1992 | Hoarty |

(Continued)

FOREIGN PATENT DOCUMENTS

| CN | 1559119 A | 12/2004 |
| CN | 101202899 A | 6/2008 |

(Continued)

OTHER PUBLICATIONS

Singer et al., "ISO Media File format specification," *International Organisation for Standardisation Organisation International De Normalisation*, ISO/IEC 14496-1:2001/Amd. 3, 2001, 45 pages.

(Continued)

*Primary Examiner* — Krista Zele
*Assistant Examiner* — James Forman
(74) *Attorney, Agent, or Firm* — Tarolli, Sundheim, Covell & Tummino LLP (57) ABSTRACT

A method for delivering media content includes receiving a request for media content from a client and identifying a first media file containing media content associated with the request. The first file has a first media format. The method further includes initiating creation of a second media file associated with the request and estimating one or more characteristic of the second media file. The second media file has a second media format. Additionally, the method includes generating media information for the second media file based on the estimated characteristics of the second media file and transmitting the media information to the client before creation of the second media file has been completed.

30 Claims, 3 Drawing Sheets

(51) Int. Cl.
*H04N 21/236* (2011.01)
*H04N 21/2662* (2011.01)
*H04N 21/472* (2011.01)
*H04N 21/658* (2011.01)
*H04L 12/58* (2006.01)

(56) References Cited

U.S. PATENT DOCUMENTS

| | | |
|---|---|---|
| 5,220,420 A | 6/1993 | Hoarty |
| 5,319,455 A | 6/1994 | Hoarty |
| 5,361,091 A | 11/1994 | Hoarty |
| 5,412,720 A | 5/1995 | Hoarty |
| 5,442,700 A | 8/1995 | Snell |
| 5,485,197 A | 1/1996 | Hoarty |
| 5,526,034 A | 6/1996 | Hoarty |
| 5,550,578 A | 8/1996 | Hoarty |
| 5,557,316 A | 9/1996 | Hoarty |
| 5,587,734 A | 12/1996 | Lauder |
| 5,594,507 A | 1/1997 | Hoarty |
| 5,812,665 A | 9/1998 | Hoarty |
| 5,822,537 A * | 10/1998 | Katseff et al. ............... 709/231 |
| 5,883,661 A | 3/1999 | Hoarty |
| 5,953,506 A | 9/1999 | Kalra |
| 6,034,678 A | 3/2000 | Hoarty |
| 6,055,315 A | 4/2000 | Doyle |
| 6,064,377 A | 5/2000 | Hoarty |
| 6,100,883 A | 8/2000 | Hoarty |
| 6,177,931 B1 | 1/2001 | Alexander |
| 6,205,582 B1 | 3/2001 | Hoarty |
| 6,253,238 B1 | 6/2001 | Lauder |
| 6,305,020 B1 | 10/2001 | Hoarty |
| 6,345,279 B1 | 2/2002 | Li |
| 6,407,680 B1 | 6/2002 | Lai |
| 6,421,733 B1 | 7/2002 | Tso et al. ..................... 709/246 |
| 6,490,627 B1 * | 12/2002 | Kalra et al. .................. 709/231 |
| 6,498,897 B1 | 12/2002 | Nelson |
| 6,510,513 B1 | 1/2003 | Danieli |
| 6,593,860 B2 | 7/2003 | Lai |
| 6,757,429 B2 | 6/2004 | Hu |
| 6,823,082 B2 | 11/2004 | Hu |
| 6,888,477 B2 | 5/2005 | Lai |
| 6,904,168 B1 | 6/2005 | Steinberg |
| 6,938,157 B2 | 8/2005 | Kaplan |
| 6,963,972 B1 | 11/2005 | Chang |
| 6,970,602 B1 | 11/2005 | Smith |
| 7,088,823 B2 | 8/2006 | Fetkovich |
| 7,093,277 B2 | 8/2006 | Perlman |
| 7,734,800 B2 * | 6/2010 | Gupta et al. .................. 709/231 |
| 2001/0056460 A1 | 12/2001 | Sahota |
| 2002/0006204 A1 | 1/2002 | England |
| 2002/0087957 A1 | 7/2002 | Norris |
| 2002/0120586 A1 | 8/2002 | Masaki |
| 2002/0129140 A1 | 9/2002 | Peled |
| 2002/0131496 A1 * | 9/2002 | Vasudevan et al. ...... 375/240.11 |
| 2002/0138848 A1 | 9/2002 | Alao |
| 2002/0172418 A1 | 11/2002 | Hu |
| 2002/0194227 A1 | 12/2002 | Day |
| 2003/0004880 A1 | 1/2003 | Banerjee |
| 2003/0053702 A1 | 3/2003 | Hu |
| 2003/0061369 A1 * | 3/2003 | Aksu et al. ................... 709/231 |
| 2003/0105739 A1 | 6/2003 | Essafi |
| 2003/0158969 A1 | 8/2003 | Gimson |
| 2003/0185395 A1 | 10/2003 | Lee |
| 2003/0196206 A1 | 10/2003 | Shusman |
| 2004/0003117 A1 | 1/2004 | McCoy |
| 2004/0086039 A1 | 5/2004 | Reynolds |
| 2004/0111476 A1 | 6/2004 | Trossen |
| 2004/0133548 A1 | 7/2004 | Fielding |
| 2004/0133927 A1 | 7/2004 | Sternberg |
| 2004/0139233 A1 | 7/2004 | Kellerman |
| 2004/0193648 A1 | 9/2004 | Lai |
| 2005/0004997 A1 | 1/2005 | Balcisoy et al. |
| 2005/0060411 A1 * | 3/2005 | Coulombe et al. ............ 709/227 |
| 2005/0132264 A1 | 6/2005 | Joshi |
| 2005/0172127 A1 | 8/2005 | Hartung |
| 2005/0198210 A1 | 9/2005 | Janik |
| 2005/0213826 A1 | 9/2005 | Neogi |
| 2005/0265395 A1 | 12/2005 | Kim |
| 2005/0273598 A1 | 12/2005 | Silverbrook |
| 2005/0286497 A1 | 12/2005 | Zutaut |
| 2006/0015649 A1 | 1/2006 | Zutaut |
| 2006/0026302 A1 | 2/2006 | Bennett |
| 2006/0117379 A1 | 6/2006 | Bennett |
| 2006/0136457 A1 | 6/2006 | Park et al. |
| 2006/0167803 A1 | 7/2006 | Aydar |
| 2006/0167987 A1 * | 7/2006 | Yamane ........................ 709/203 |
| 2006/0168227 A1 | 7/2006 | Levine et al. |
| 2006/0168323 A1 | 7/2006 | Kim |
| 2006/0179472 A1 | 8/2006 | Chang |
| 2006/0218611 A1 | 9/2006 | Son |
| 2006/0242318 A1 | 10/2006 | Nettle |
| 2006/0265657 A1 | 11/2006 | Gilley |
| 2007/0067390 A1 | 3/2007 | Agnoli |
| 2007/0067725 A1 | 3/2007 | Cahill |
| 2007/0124816 A1 | 5/2007 | Abigail |
| 2007/0162945 A1 | 7/2007 | Mills |
| 2007/0186005 A1 | 8/2007 | Setlur et al. |
| 2007/0255659 A1 | 11/2007 | Yen |
| 2008/0016185 A1 * | 1/2008 | Herberger et al. ............ 709/219 |
| 2008/0091845 A1 | 4/2008 | Mills |
| 2008/0114894 A1 * | 5/2008 | Deshpande ................... 709/237 |
| 2008/0141303 A1 | 6/2008 | Walker |
| 2008/0195698 A1 | 8/2008 | Stefanovic |
| 2008/0195761 A1 | 8/2008 | Jabri et al. |
| 2008/0231480 A1 | 9/2008 | Lai |
| 2008/0235200 A1 | 9/2008 | Washington |
| 2009/0006643 A1 * | 1/2009 | Lee .............................. 709/231 |
| 2009/0013414 A1 | 1/2009 | Washington |
| 2009/0024626 A1 | 1/2009 | Takei |
| 2009/0083279 A1 | 3/2009 | Hasek |
| 2009/0119322 A1 | 5/2009 | Mills |
| 2009/0164601 A1 | 6/2009 | Swartz |
| 2009/0232220 A1 * | 9/2009 | Neff et al. ................ 375/240.21 |
| 2010/0027765 A1 | 2/2010 | Schultz |
| 2010/0070608 A1 | 3/2010 | Hosur |
| 2010/0185776 A1 | 7/2010 | Hosur |
| 2011/0246883 A1 * | 10/2011 | Zizys et al. ................... 715/716 |

FOREIGN PATENT DOCUMENTS

| | | |
|---|---|---|
| GB | 2369203 A | 5/2002 |
| WO | WO 99/07158 | 2/1999 |
| WO | 02/082271 | 10/2002 |
| WO | 03/032136 | 4/2003 |
| WO | WO 03/073770 A1 | 9/2003 |
| WO | 2004/077790 | 9/2004 |
| WO | 2004/102968 A1 | 11/2004 |
| WO | 2005/006768 | 1/2005 |
| WO | 2005/046140 | 5/2005 |
| WO | 2006/134310 | 12/2006 |
| WO | WO 2007/053957 A1 | 5/2007 |
| WO | WO 2007/063485 A2 | 6/2007 |
| WO | 2009/024926 | 2/2009 |

OTHER PUBLICATIONS

Nikolaus et al., "Adaptive progressive download based on the MPEG-4 file format," *Journal of Zhejiang University SCIENCE A*, 2006, 6 pages.

PCT Notification of Transmittal of the International Search Report and The Written Opinion of the International Searching Authority, or the Declaration with attached International Search Report in International Application No. PCT/US2009/060590, Jan. 22, 2010, 18 pages.

U.S. Appl. No. 11/772,582, Office Action dated Dec. 21, 2010, Washington.

U.S. Appl. No. 11/772,582, Office Action dated Jun. 28, 2010, Washington.

U.S. Appl. No. 12/208,122, Office Action dated Oct. 29, 2010, Hosur.

U.S. Appl. No. 11/688,936, Office Action dated Aug. 7, 2009, Washington.

U.S. Appl. No. 11/328,587, Office Action dated Dec. 10, 2010, Mills.

(56) References Cited

OTHER PUBLICATIONS

U.S. Appl. No. 11/328,587, Office Action dated Jul. 8, 2010, Mills.
U.S. Appl. No. 11/328,587, Office Action dated Apr. 16, 2009, Mills.
U.S. Appl. No. 11/328,587, Office Action dated Sep. 19, 2008, Mills.
U.S. Appl. No. 11/549,226, Office Action dated Sep. 30, 2010, Mills.
U.S. Appl. No. 11/549,226, Office Action dated Mar. 1, 2010, Mills.
U.S. Appl. No. 11/549,226, Office Action dated Aug. 3, 2009, Mills.
U.S. Appl. No. 11/549,226, Office Action dated Oct. 13, 2006, Mills.
U.S. Appl. No. 11/936,548, Office Action dated Nov. 7, 2008, Mills.
U.S. Appl. No. 11/936,548, Office Action dated Jan. 5, 2010, Mills.
"Akimbo adds RSS feeds to video-on-demand service," Online Reporter, No. 455, Aug. 6, 2005.
APEC eSecurity Task Group, "Guidelines to Issue Certificates Capable of Being Used in Cross Jurisdictional eCommerce," *APEC*, Dec. 2004.
Bezoza, Alan et al., "How the Internet Will Disrupt the Long-Term Video Value Chain," Friedman, Billings, Ramsey & Co., Inc., Oct. 6, 2005.
Kantarci, Aylin et al.; "Rate adaptive video streaming under lousy network conditions;" *Signal Processing: Image Communication 19*, Mar. 22, 2004.
PCT Notification of Transmittal of the International Search Report and the Written Opinion of the International Searching Authority, or the Declaration with attached PCT International Search Report and the Written Opinion of the International Searching Authority in International Application No. PCT/US2008/055079, Sep. 4, 2008.
PCT Notification of Transmittal of the International Search Report and the Written Opinion of the International Searching Authority, or the Declaration with attached PCT International Search Report and the Written Opinion of the International Searching Authority in International Application No. PCT/US2009/060590, Jan. 22, 2010.
Schierl, Thomas et al.; "Mobile Video Transmission Using Scalable Video Coding;" *IEEE Transactions on circuits and Systems for Video Technology*; 17:9; pp. 1204-1217, Sep. 2007.
Xin, Jun et al., "Digital Video Transcoding," *Proceedings of the IEEE*, 93:1, pp. 84-97, Jan. 2005.
U.S. Appl. No. 12/208,122, Office Action dated Apr. 19, 2011, Hosur.
U.S. Appl. No. 12/208,122, Office Action dated Sep. 15, 2011, Hosur.
U.S. Appl. No. 11/328,587, Office Action dated Apr. 29, 2011, Mills.
U.S. Appl. No. 11/549,226, Office Action dated Apr. 20, 2011, Mills.
U.S. Appl. No. 12/690,166, Office Action dated Mar. 24, 2011, Hosur.
U.S. Appl. No. 12/690,166, Office Action dated Sep. 29, 2011, Hosur.
Office Action for U.S. Appl. No. 12/208,122, Aug. 25, 2010.
Office Action for U.S. Appl. No. 11/772,582, Aug. 29, 2011.
Office Action for U.S. Appl. No. 11/328,587, Oct. 26, 2011.
Hosur, Response to Election/Restriction Requirement for U.S. Appl. No. 12/208,122, Sep. 20, 2010.
Hosur, Response to Nonfinal Office Action for U.S. Appl. No. 12/208,122, Jan. 31, 2011.
Hosur, Response to Nonfinal Office Action for U.S. Appl. No. 12/208,122, Jul. 19, 2011.
Hosur, Request for Continued Examination Transmittal and Amendment Filed with Request for Continued Examination for U.S. Appl. No. 12/208,122, Nov. 23, 2011.
USPTO, Nonfinal Office Action for U.S. Appl. No. 12/690,166, Dec. 21, 2010.
Hosur, Response to Nonfinal Office Action for U.S. Appl. No. 12/690,166, Dec. 30, 2010.
Hosur, Response to Nonfinal Office Action for U.S. Appl. No. 12/690,166, Jul. 25, 2011.
Hosur, Request for Continued Examination Transmittal and Amendment Filed with Request for Continued Examination for U.S. Appl. No. 12/690,166, Nov. 23, 2011.
Search Report and Written Opinion for CN Application No. 200980150268.0 (Chinese and English language), Jun. 27, 2013.
Non-Final Office Action for U.S. Appl. No. 12/208,122, Nov. 7, 2014.

* cited by examiner

SYSTEM AND METHOD FOR PROGRESSIVE DELIVERY OF MEDIA CONTENT

RELATED APPLICATIONS

This application claims the benefit of U.S. Provisional Application No. 61/105,230, filed Oct. 14, 2008, which is incorporated by reference herein in its entirety.

TECHNICAL FIELD

This invention relates, in general, to digital media content and, more particularly, to low-latency content delivery.

BACKGROUND OF THE INVENTION

With the dramatic increase in the quantity and diversity of video, audio, and multimedia content that has occurred in recent years, the need for systems and techniques to efficiently deliver content to users has likewise increased. Internet-ready cell phones, personal data assistants (PDAs), and other mobile media devices have spurred increased demand for content delivery in a variety of different target formats. Furthermore, the rapid growth in user-generated content has created a large supply of media content available to users in a large number of disparate source formats.

Converting content from a source format in which the content is created or stored to a target format appropriate for use by a particular media player can be time-consuming. Delays in the delivery of media content can detract from the user's enjoyment of the content or negatively affect the user's experience in other ways. Moreover, in systems where delivery resources are limited, converting media content to a format appropriate for a particular user may result in processing bottlenecks, network congestion, and additional delays that affect other users. As a result, delays occurring during the delivery of content to individual users can lead to significant reductions in the overall efficiency of a content-delivery system.

SUMMARY OF EXAMPLE EMBODIMENTS

In accordance with the present invention, disadvantages and problems associated with delivering digital media content have been substantially reduced or eliminated.

In accordance with one embodiment of the present invention, a method for delivering media content includes receiving a request for media content from a client and identifying a first media file containing media content associated with the request. The first file has a first media format. The method further includes initiating creation of a second media file associated with the request and estimating one or more characteristic of the second media file. The second media file has a second media format. Additionally, the method includes generating media information for the second media file based on the estimated characteristics of the second media file and transmitting the media information to the client before creation of the second media file has been completed.

Technical advantages of certain embodiments include the ability to deliver media content to a variety of different devices in multiple formats. Certain embodiments provide for low-latency delivery with minimal delay between the time a user requests a particular media file and the time that the delivery system begins delivering the requested content to the user. Additionally, particular embodiments may be implemented without introducing constraints on the software or hardware utilized by the user. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
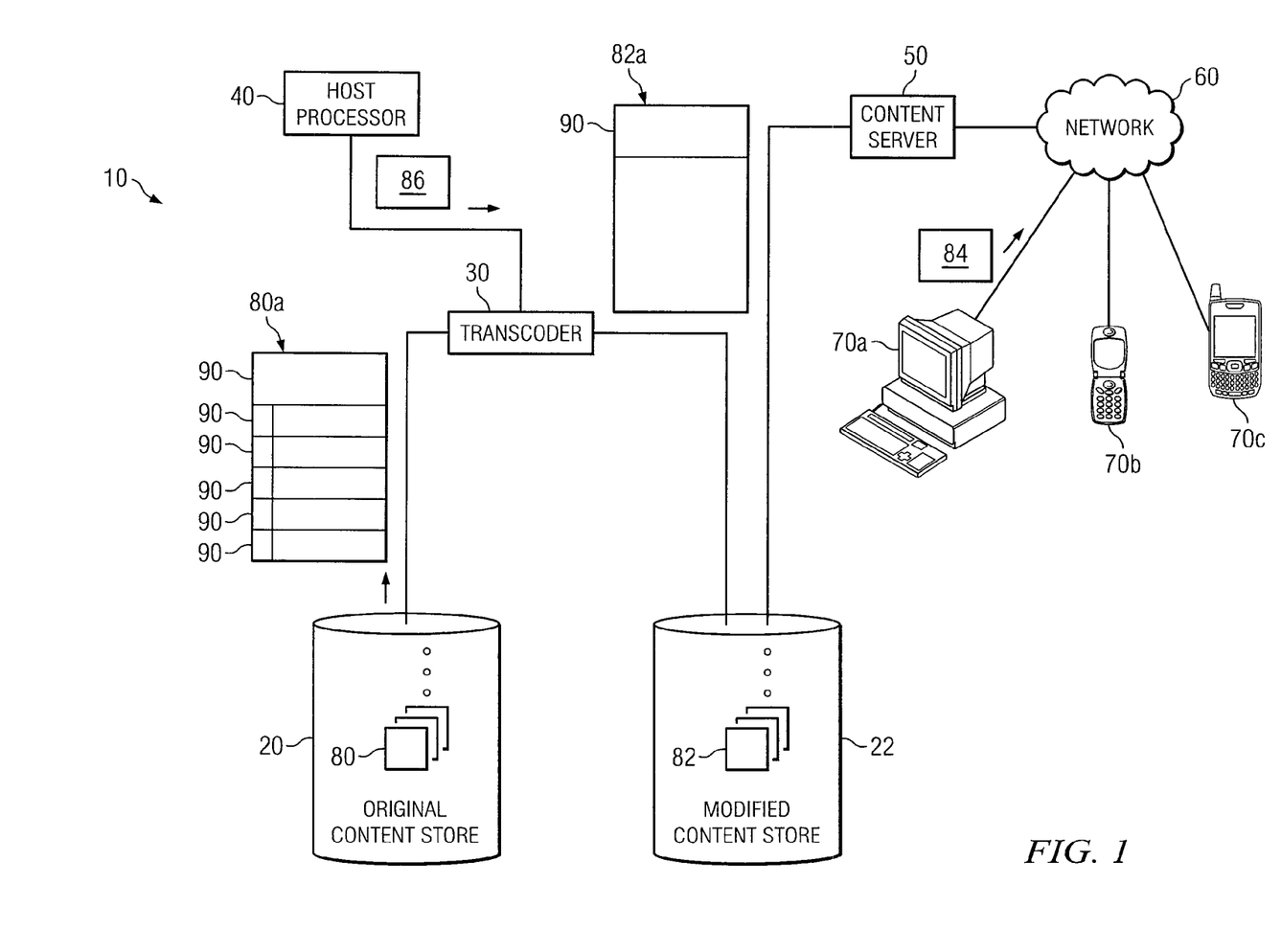
FIG. 1 illustrates a system for delivering media content according to particular embodiments of the present invention.

FIG. 1 illustrates a particular embodiment of a content-delivery system 10 for delivering digital media content to clients 70 from source files 80 stored in or generated by content-delivery system 10. System 10 includes original content store 20, transcoder 30, modified content store 22, host processor 40, content server 50, network 60, and clients 70. To provide content to clients 70 having a variety of different reception and display requirements, content-delivery system 10 may modify requested media content in source files 80 to create target files 82 containing the same or similar content in a format suitable for transmission to and/or display by a particular client 70. By initiating the transmission or delivery of the relevant target file 82 to a requesting client 70 before the entire target file 82 has been generated, system 10 may reduce the latency associated with processing content for delivery to a diverse range of clients 70.

Furthermore, in particular embodiments, content-delivery system 10 may support delivery techniques in which clients 70 utilize certain information (referred to generically herein as "media information 90") describing the content stored in the relevant target file 82 to configure themselves for receipt and playback of the requested media content. For example, in particular embodiments, content-delivery system 10 may support progressive downloading of content and clients 70 may be configured to use media information 90 provided by content-delivery system 10 to configure themselves for receipt of content and to identify appropriate portions of converted media from for request. However, the relevant media information 90 may describe properties of the associated target file 82 that may not be determined until that target file 82 is fully created. Thus, as described further below, content-delivery system 10 may reduce latency in the delivery of content to such clients 70 by estimating certain characteristics of a target file 82 before it has been fully created and generating media information 90 for target file 82 based on the estimated characteristics.

For purposes of this description and the claims that follow, "estimating" includes, but is not limited to, any predicting or approximating of a characteristic, property, or other value. "Estimating" may also include any calculating, selecting, or other manner of determining a value that is initiated before the relevant value is otherwise set, even if the relevant value is then necessarily set based on the outcome of the estimating operation. For example, as used herein, "estimating" may refer to a process for calculating a frame size for content to be written to a media file even if the content is then written in frames sized based on this estimation. As a result, in particular embodiments, estimating may predetermine a value, instead of merely approximating or predicting the value.

In the example embodiment illustrated in FIG. 1, original content store 20 and modified content store 22 each represent or include any appropriate type of memory devices. Content stores 20 and 22 may each comprise, for example, volatile or non-volatile, local or remote devices suitable for storing data, such as random access memory (RAM) devices, read only memory (ROM) devices, magnetic storage devices, optical storage devices, or any other suitable data storage devices. Additionally, although content stores 20 and 22 are both shown as a single element in system 10, content stores 20 and 22 may each represent a plurality of devices and may be distributed across multiple locations within system 10. For example, in particular embodiments, content stores 20 and 22 may represent a network-attached storage (NAS) or portion thereof.

Original content store 20 stores source files 80 for delivery to clients 70. As noted above, source files 80 may comprise any appropriate type of media content. Specific examples of source files 80 include video/multimedia content files such as Moving Picture Experts Group (MPEG), Windows Media Video (WMV), Audio Video Interleave (AVI), and Quick-Time files; audio content files such as Waveform audio (WAV), MPEG-1 Audio Layer 3 (MP3), and/or Windows Media Audio (WMA) files; and/or content files of any other appropriate type or format. Source files 80 in original content store 20 may all be stored in a single storage format or may be stored in a variety of different formats appropriate for transmission to or display by different clients 70. Although shown in FIG. 1 as part of system 10, original content store 20 may represent components external to system 10, such as memory components distributed throughout the Internet. As a result, in particular embodiments, transcoders 30 may be able to retrieve, receive, otherwise access and/or process source files 80 provided by a vast number of content sources available throughout the Internet for delivery to clients 70.

Modified content store 22 stores target files 82 representing content from source files 80 that has been generated, transcoded, or otherwise modified by transcoders 30. In particular embodiments, modified content store 22 represents storage local or internal to transcoders 30, such as the internal memory of a web server functioning as one of transcoders 30. In certain embodiments, transcoder 30 may store target files 82 in modified content store 22 that contain modified content from particular source files 80 while transcoder 30 continues to modify content to create the relevant target file 82. Target files 82 may comprise media content of any appropriate type or format including, but not limited to, those listed above for source files 80. Additionally, although referred to here as "files," in certain embodiments, a target file 82 stored in modified content store 22 may, at a given point in time, represent a partial file that is not complete according to a type or format associated with the relevant target file 82 or the content it contains. Modified content store 22 may also store media information 90 generated by transcoder 30 during the process of transcoding source files 30, as part of the created target file 82 and/or as separate data elements. As discussed further below, media information 90 may be used by clients 70 to facilitate downloading of target files 82.

Transcoder 30 retrieves, receives, or otherwise accesses requested content from original content store 20 and modifies requested content in a manner suitable for transmission to and display by the requesting client 70. Transcoder 30 then writes modified content to target file 82. Depending on the capabilities of the requesting client 70 and the characteristics of the requested source file 80, transcoders 30 may transcode, transrate, adjust the resolution of, or otherwise modify content or characteristics of the requested source file 80 in any appropriate manner to make the content suitable for transmission to and/or playback by the requesting client 70. As part of modifying content, transcoders 30 may modify the content of a requested source file 80 from a first format, such as an original format in which the relevant source file 80 is stored, to a second format, such as a target format appropriate for transmission to and display by a requesting client 70. For purposes of this description and the claims that follow, the "format" of content refers to an encoding, bit-rate, resolution, frame rate, configuration, and/or any other aspect, characteristic, or property of the relevant content that is associated with transmitting the content to or displaying the content with a particular type of client 70.

Additionally, as described further below, transcoder 30 may also generate media information 90 that allows clients 70 to begin download and playback of content from target files 82 before transcoder 30 has finished creating the relevant target files 82 and/or transcoding the corresponding source file 80. As described further below, media information 90 may include any suitable form of data, code, or information that describes the requested media content or the target file 82 into which the requested media content is being written. The contents of a particular example embodiment of transcoder 30 are described in further detail below with respect to FIG. 3.

Content server 50 receives requests from clients 70 to retrieve, download, stream, or otherwise transmit content from source files 80 to clients 70 and, in response to these requests, deliver requested content to clients 70. In particular embodiments, content server 50 may be responsible for determining whether a source file 80 containing the requested media content will need to be transcoded, transrated, or otherwise modified for transmission to and/or display by the requesting client 60. If so, content server 50 may forward the received request to host processor 40 or directly to transcoder 30 to initiate conversion of the requested source file 80. Content server 50 may also authenticate users, execute content search requests, or otherwise facilitate interaction between users and the content-provision services offered by system 10.

Host processor 40 receives requests for media content from content server 50 and manages the operation of transcoder 30 in preparing the requested content for delivery to clients 70. In particular embodiments, host processor 40 is responsible for generating and communicating to transcoder 30 a workflow that identifies a particular source file 80 requested by a client 70 and an appropriate target format for the source file. Additionally, in particular embodiments, content-delivery system 10 may include multiple transcoders 30 capable of handling content requests from several different clients 70 in parallel. In such embodiments, host processor 40 may also be responsible for selecting an appropriate transcoder 30 to handle each request and may perform load-balancing or otherwise distribute transcoding tasks between the various transcoders 30.

Although transcoder 30, host processor 40, and content server 50 are each shown in FIG. 1 as a single component, in particular embodiments, each may represent functionality provided by several separate physical components. Additionally, any two or more of transcoder 30, host processor 40, and content server 50 may represent, in part or in whole, the same component. For example, in particular embodiments, host processor 40 may be part of the same physical component as transcoder 30. In general, transcoder 30, host processor 40, and content server 50 may each represent any appropriate combination of software and/or hardware suitable to provide the described functionality. In particular embodiments, transcoders 30, host processor 40, and content server 50 represent web servers configured to receive and respond to Hypertext Transfer Protocol (HTTP) requests from clients 70 and each other.

Network 60 represents any form of communication network supporting circuit-switched, packet-based, and/or any other suitable type of communication over wired and/or wireless communication links. Although shown in FIG. 1 as a single element, communication network may represent one or more separate networks, including all or parts of various different networks that are separated and serve different groups of clients 70. Network 60 may include routers, hubs, switches, gateways, call controllers, and/or any other suitable components in any suitable form or arrangement. In general, network 60 may comprise any combination of public or private communication equipment such as elements of the public-switched telephone network (PSTN), a global computer network such as the Internet, a local area network (LAN), a wide-area network (WAN), or other appropriate communication equipment.

Additionally, although FIG. 1 illustrates a particular configuration of elements directly connected to network 60, network 60 may, in particular embodiments, connect directly or indirectly to and/or interact with any appropriate elements of system 10. For example, although FIG. 1 shows transcoder 30 directly connected to original content store 20 and content server 50, transcoder 30 may alternatively connect to either of these elements over network 60. Accordingly, the components of system 10 may be arranged and configured in any appropriate manner to communicate over network 60 and/or over direct connections between the relevant components.

Clients 70 display, communicate, or otherwise play back content retrieved from content store 20 to users. Clients 70 may represent any type of device appropriate to play the digital media content utilized in system 10. Examples of clients 70 may include, but are not limited to, computers, video-enabled telephones, media players (such as, for example, iPods), televisions, PDAs, cell phones, portable communication devices, and other electronic devices. More generally, clients 70 may include any appropriate combination of hardware and/or software suitable to provide the described functionality. Clients 70 may couple to network 60 through a dedicated connection (wired or wireless) or may connect to network 60 only as needed to access media content. Although FIG. 1 illustrates, for purposes of example, a particular number and type of clients 70, alternative embodiments of system 10 may include any appropriate number and type of clients 70.

In particular embodiments, clients 70 may be capable of receiving and/or playing media associated with various file formats, file types, codecs, bit-rates, and/or resolutions, and/or having other appropriate characteristics. For example, in the illustrated embodiment, client 70a may comprise a computer which can play a different media file format than the video-enabled cell phone represented by client 70b or the portable communication device represented by client 70c. Consequently, as described further below, system 10 may modify requested content to match the capabilities of the specific requesting client 70.

In operation, content server 50 receives requests from clients 70 and initiates the retrieval of source files 80 containing media content requested by clients 70. Transcoder 30 may then transcode or otherwise modify the retrieved source file 80 to provide content suitable for transmission to and/or display by the requesting client 70. Transcoder 30 writes modified content to a corresponding target file 82 for transmission to the requesting client 70. Additionally, the requesting client 70 may, for some media content formats, need certain information about the media content in target file 82 before the requesting client 70 can begin playing the relevant target file 82. As a result, transcoder 30 may also generate certain media information 90 describing the media in the corresponding target file 82. To minimize the amount of time the user must wait before client 70 can begin playback of content from target file 82, transcoder 30 may generate media information 90 and transmit media information 90 to the requesting client 70 before creation of the relevant target file 82 has been completed. The requesting client 70 may then begin playback of a portion of the modified content while transcoder 30 continues to write modified content to target file 82.

An example of this process is illustrated in FIG. 1. As shown by FIG. 1, a client 70 (here, client 70a) initiates the delivery process by transmitting a content request 84 to content server 50. Content request 84 may identify a specific source file 80 or may describe characteristics (using, for example, keywords) of the requested media content. Content request 84 may represent any appropriate message, packet, or other collection of information requesting delivery of content by the transmitting client 70. For example, in particular embodiments, content request 84 represents a Hypertext Transfer Protocol (HTTP) request that identifies a particular source file 80 stored by original content store 20.

In response to receiving content request 84, content server 50 determines an appropriate format (referred to here as the "target format") for the requested content to allow, facilitate, or optimize transmission to and playback by client 70a. Content server 50 may determine the target format based on any appropriate information, considerations, or circumstances. As one example, content request 84 may indicate the appropriate format for the requested content. Thus, in particular embodiments, content server 50 may receive an HTTP request specifying the codec, bit-rate, and/or other parameters for the requested content. As a result, content server 50 may be able to determine, based on information contained in the HTTP request, the output format and characteristics appropriate for the requested content.

As another example, content server 50 may identify client 70a and/or relevant characteristics of client 70a and determine a target format for the requested content based on this information. For example, content server 50 may identify whether the client is a computer (such as client 70a), cellular phone (such as client 70b), or personal data assistant (such as client 70c), and/or other type of client device. In response, content server 50 may determine the format characteristics appropriate for the particular client 70a-c based on its type.

As yet another example, content server 50 may detect characteristics of the particular network or portion of network 60 that client 70a is communicating over to determine an appropriate target format in which to provide the requested content to client 70a. Thus, in particular embodiments, content server 50 may determine, based on the fact that content request 84 was received over a certain type of network, an appropriate codec or bit-rate at which to transmit the requested content to client 70a. In general, however, content server 50 may determine, in any suitable manner and based on input from any appropriate components, the proper format and characteristics for the content requested by client 70a.

Content server 50 then forwards content request 84 to transcoder 30. Alternatively, particular embodiments of system 10 include host processor 40 responsible for managing the operation of one or more transcoders 30, and content server 50 may transmit content request to host processor 40. Host processor 40 generates a workflow 86 indicating the modification to be completed by transcoder 30 and transmits workflow 86 to transcoder 30. Additionally, on particular embodiments, system 10 may include multiple transcoders 30 and host processor 40 may be responsible for load balancing and assigning transcoding responsibilities to transcoders 30. In response to receiving content request 84 from content server 50 or workflow 86 from host processor 40, transcoder 30 retrieves the requested source file 80, in this case source file 80a. Transcoder 30 then begins creating a target file 82 appropriate for transmission to and playback by client 70a (shown in FIG. 1 as target file 82a).

As part of this process, transcoder 30 generates media information 90 for target file 82a. As noted above, media information 90 describes the media content stored by a particular media file and clients 70 may use media information 90 associated with a received media file to configure themselves for the associated media file, request the contents of the associated media file, and/or otherwise facilitate receipt and playback of requested media content. Examples of media information 90 may include a file size, frame rate, or time duration of a particular media file and/or frame sizes, media types, or time stamps of individual portions of the media content in the media file.

Figure 2A:
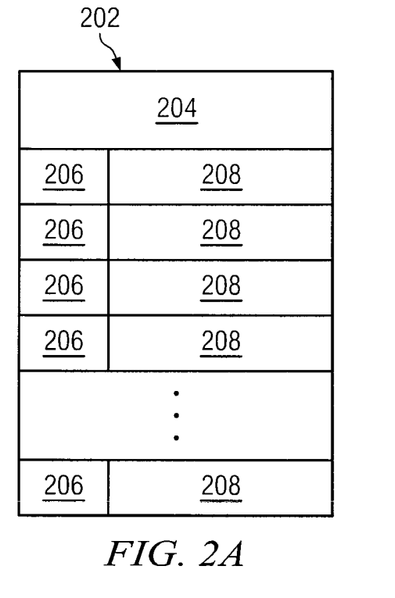
FIG. 2A illustrates one type of media file that may be utilized in particular embodiments of the system shown in FIG. 1.
Figure 2B:
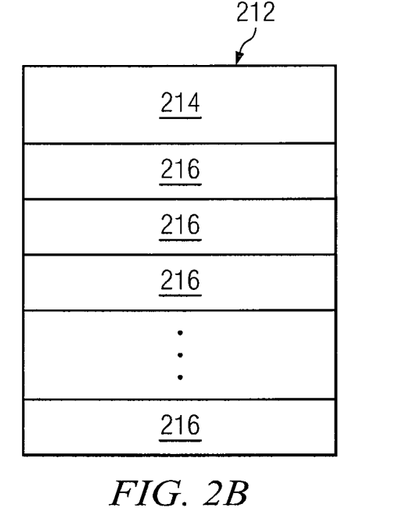
FIG. 2B illustrates another type of media file that may be utilized in particular embodiments of the system.

As noted above, system 10 may store and deliver source files 80 having a variety of different formats and file structures. For example, FIG. 2A illustrates a particular type of file (a type referred to generically herein as "Type A") in which media information 90 is interspersed with content throughout the illustrated file. FIG. 2B illustrates another type of file (a type referred to generically herein as "Type B") in which media information 90 and content are segregated in the illustrated file.

When transcoding certain types of source files 80, transcoder 30 may be able to extract media information 90 directly from these source files 80 and generate media information for corresponding target files 82 based on the extracted media information 90. Transcoder 30 may write the media information 90 for these target files 82 to the respective target files 82 before writing any modified content to these target files 82. Content server 50 may then transmit media information 90 for such target files 82 to the requesting client 70 as transcoder 30 begins transcoding source file 80. Type B source files 80, for example, have the entirety of their media information 90 located at the beginning of the file. Thus, transcoder 30 may be able to access all media information 90 in a Type B source file 80 at the beginning of the transcoding process. As a result, when transcoding Type B source files 80, transcoder 30 may extract media information 90 from the beginning of the relevant source file 80 as soon as transcoder 30 begins transcoding and make such media information 90 available to the request client 70. The requesting client 70 may then use the transmitted media information 90 to prepare a media player at the requesting client 70 for playback and to begin requesting blocks of content from the target file 82a being transcoded by transcoder 30.

Alternatively, when transcoding other types of source files 80, transcoder 30 may be unable to access all media information 90 in the requested source file 80 at the beginning of transcoding. Type A source files 80, for example, have media information 90 interspersed with content throughout the file. As a result, transcoder 30 may be unable to extract media information 90 from a Type A source file 80 when transcoder 30 first begins transcoding the relevant source file 80 and thus may be unable to access the data which transcoder 30 would otherwise use to generate media information for the corresponding target files 82. The requesting client 70 may expect and/or require media information 90, however, before the requesting client 70 can begin downloading the relevant target file 82 and/or playing content from the relevant target file 82. As a result, for certain types of source files 80, transcoder 30 may estimate certain properties of the requested source file 80 to generate media information 90 for the corresponding target file 82 that will allow the requesting client 70 to begin receiving and playing content from the relevant target file 82.

In the example illustrated by FIG. 1, source file 80a is assumed to be a Type A media file. As a result, when transcoder 30 begins transcoding source file 80a, transcoder 30 is unable to access all of the media information 90 in source file 80a. Consequently, transcoder 30 may generate media information 90 for target file 82a using data provided in workflow 86, information available at the beginning of source file 80a, parameters estimated by transcoder 30, and/or any other appropriate information available to transcoder 30.

For example, in particular embodiments, part of the media information 90 created for target file 82a is dependent on the target format and rate for the requested content. As a result, transcoder 30 may copy this data from content request 84 or workflow 86 to the media information 90 for target file 82a. In particular embodiments, transcoder 30 may copy such information as the frame rate, the duration, and the types of audio and video codecs utilized by the file directly from content request 84 or workflow 86 to the media information 90 for target file 82a. Additionally, transcoder 30 may use information in the workflow 86 or content request 84 to determine other fields of media information 90 for target file 82a. For example, transcoder 30 may calculate the total number of frames in source file 80a by multiplying a frame rate and duration available in workflow 86 and then write this total number of frames to media information 90 in target file 82a.

Additionally, transcoder 30 may estimate parameters not available at the start of transcoding. For example, in particular embodiments, transcoder 30 utilizes a-priori estimation techniques to (1) estimate fields in media information 90 such as time-stamps for audio and video frames and the size of such frames based on the relevant coding formats and coding parameters such as the bit rate, frame rate, sample rate, I-frame interval, and the total number of media frames in the requested source file 80 and/or the target file 82 to be generated by transcoder 30; and (2) estimate the interleaving format of audio and video frames in the target file 82a.

In particular embodiments, transcoder 30 may start this process by modeling the bits per frame versus encoder parameter setting characteristics. For a given video or audio encoding and its corresponding encoding parameter settings, the output of transcoder 30 may be characterized to determine the minimum, maximum, and average level of bits per frame for a given encoder parameter settings. Based on this characterization, transcoder 30 may model frame sizes in terms of bits per frame as a function of encoding bit rate, frame rate/sample rate, temporal location of the frame, resolution, encoding format, and/or any other appropriate characteristic or factor. The frame size of a target file 82 may then be estimated based upon this model. For video media, transcoder 30 may determine the frequency of occurrence of I-frames in a bit stream based on the encoder parameter settings and may estimate the frame size of I frames based on this frequency. Furthermore, transcoder 30 may calculate the time stamp difference between two consecutive frames based on the frame rate using the following formula: (time stamp difference between two consecutive frames)=1/(frame rate). Using this formula, transcoder 30 can then determine the time stamp for each frame as follows: Time stamp of current frame=time stamp of immediately previous frame+time stamp difference between consecutive frames.

Transcoder 30 may also determine an interleaving order for different types of media data in target file 82. For example, transcoder 30 may determine that a predetermined amount of video content will be written to target file 82 for a given amount of audio content. Transcoder 30 may determine this order based on constraints of the target format and/or other appropriate considerations. As discussed further below, transcoder 30 may later use this interleaving order in writing content to target file 82.

Based on the time stamp for each frame, the frame size, and an estimate of the interleaving format of audio and video frames in the media, transcoder 30 can then determine the estimated location of each individual audio and video frame in the target file 82 to be generated by transcoder 30. Transcoder may generate media information 90 containing the estimated location of each media frame in target file 82 and other appropriate data required or expected by client 70*a*. Transcoder 30 may then transmit media information 90 to content server 50 for subsequent transmission to client 70*a*.

As one example, transcoder 30 may be configured to write modified video and audio content to target files 82 in alternating blocks that contain a fixed amount of time of the respective type of content. As a result, transcoder 30 may determine an amount of time, X, associated with each block of video or audio data to be written. While this amount may be determined based on any suitable considerations, transcoder 30 may be configured, in particular embodiments, to write audio and video data to all target files 82 in blocks containing a predetermined amount of content (e.g., 100 ms) regardless of the formats involved. Based on the amount of time associated with each block and any other appropriate factors, transcoder 30 may then determine a number of video frames and a number of audio frames to write to each block of video and audio content, respectively, in the relevant target file 82. For example, in particular embodiments, transcoder 30 determines the number of video frames (N1) to write to each block of video content based on a video frame rate (R1) associated with the target format, according to the equation N1=X×R1, and determines the number of audio frames (N2) to write to each block of audio content based on a samples per frame value (S) associated with the target format and a sample rate (R2) set by transcoder 30 or client 70*a* (e.g., based on a desired audio quality), according to the equation N2=X×(R2/S). Transcoder 30 may then use the number of video frames in each block of video data, N1, and the number of audio frames in each block of audio data, N2, to estimate various characteristics of the target file 82 to be written for the current request, such as the location of each block of audio and video content, the time stamps for each block, or the frame size for the frames written in these blocks. These characteristics may be included in media information 90 generated by transcoder 30 and transmitted to client 70*a*. Additionally, as described further below, transcoder 30 may write data to the relevant target file 82 in conformance with or based in some manner on these estimated characteristics.

In particular embodiments with a greater tolerance for latency, transcoder 30 may transcode a few frames of audio and/or video content to be written to target file 82*a* and buffer these frames for analysis before generating media information 90. Transcoder 30 may then refine the parameters estimated based on the above-described techniques using data from the actual encoded media frames. Consequently, transcoder may be able to achieved improved frame-size estimates as a result. Transcoder 30 may then utilize the improved frame-size estimates to generate media information 90 for frames that have not yet been transcoded. Transcoder 30 may then transmit data for the transcoded frames and the estimated data for the still-to-be transcoded frames together to client 70*a* as media information 90.

After estimating media information 90 for use by client 70*a*, transcoder 30 may then begin modifying content from source file 80*a* from a source format to a target format. As noted above, transcoder 30 may transcode, transrate, adjust the resolution of or otherwise modify content or characteristics of the requested source file 80 in any appropriate manner to make the content suitable for transmission to and/or playback by the requesting client 70. Transcoder 30 then writes modified content from source file 80*a* to a target file 82 (here, target file 82*a*) in modified content store 22.

In particular embodiments, because the media information 90 generated by transcoder 30 will be used by client 70*a* to request content from target file 82*a*, transcoder 30 may use media information 90 to determine how content should be written to target file 82*a*. As one example, in particular embodiments, transcoder 30 writes video and audio content to target file 82*a* in separate blocks that include a fixed number of video frames (N1) and audio frames (N2). N1 and N2 may be calculated by transcoder 30 before generating media information 90, as described above. In such embodiments, transcoder 30 may calculate estimated block locations and time stamps for each block of media content based on N1 and N2 and may include the estimated block locations and time stamps in media information 90 that is transmitted to client 70*a*. Transcoder 30 may then write video and audio content to target file 82*a* consistent with the block locations and time stamps communicated to client 70*a*.

As another example, in particular embodiments, transcoder 30 compares the frame size of transcoded video frames to an estimated video frame size included in media information 90 transmitted to client 70*a*. If transcoder 30 determines that a transcoded video frame currently being generated for target file 82*a* is larger than the video frame size included in media information 90, transcoder 30 may discard the generated video frame and replace the discarded frame in target file 82*a* with an appropriate form of dummy frame (e.g., a frame with all zeros that client 70*a* will read as a non-coded frame) or otherwise modify the frame that is written to target file 82*a* to ensure that the relevant frame does not exceed the video frame size identified in media information 90. Because such frames are most likely to occur in temporal locations in target file 82*a* that will be less affected by the missing frames, dropping these frames altogether may not result in significantly degraded video quality. On the other hand, if the generated video frame is smaller than the video frame size, transcoder 30 may pad the frame with zeros or otherwise modify the frame that is written to target file 82*a* to ensure that the relevant frame is not smaller than the expected video frame size. Similarly, transcoder 30 may use interleaving information in media information 90 to determine an appropriate interleaving pattern for audio and video content transcoder 30 writes to target file 82*a*.

As yet another example, in particular embodiments, transcoder 30 may generate audio frames for target file 82*a* that each include an end-of-frame marker (e.g., ID_END in case of Advanced Audio Coding (AAC)) marking the end of the audio frame. In such embodiments, transcoder 30 may estimate a frame size for audio frames as part of generating media information 90. Then, when generating audio frames for target file 82a, transcoder 30 may compare each audio frame generated to the estimated frame size. If a particular audio frame is smaller than the estimated audio frame size, transcoder 30 may insert a sufficient number of dummy bits (e.g., fill_elements in case of Advanced Audio Coding) or zero-valued bits between the last bit of the content data and the end-of-frame marker in the relevant frame to ensure that the size of that audio frame matches the estimated audio frame size.

After client 70a receives media information 90 from transcoder 30, client 70a may request content from target file 82a based on the received media information 90. For example, in particular embodiments, client 70a may initiate a progressive download of target file 82a by transmitting an HTTP "GET" request that has a range field identifying a portion of target file 82a (such as a particular set of audio and video frames) determined by client 70a based on the received media information 90. Content server 50 may then transmit requested portions of target file 82a to client 70a, and client 70a may initiate playback of target file 82a. In particular embodiments, client 70a may be able to begin playback of content from target file 82a before transcoder 30 has finished writing all of the transcoded media to target file 82a.

Transcoder 30 may continue to transcode content from source file 80a and write transcoded content to target file 82a. Additionally, client 70a may continue to request content from target file 82a until all of the content has been retrieved from target file 82a and played by client 70a. Content server 50 may then transmit an end-of-file indication to client 70a, and client 70a may terminate playback of the requested content.

Under certain circumstances, client 70a may request a portion of the data in target file 82a before transcoder 30 has written that portion to target file 82a. Particular embodiments of system 10 may address such situations by utilizing data-flow metering techniques. Data-flow metering techniques control the rate at which client 70a receives data from target file 82a to maintain smooth playback. System 10 may implement data flow metering in several different ways.

For example, if content server 50 is transmitting content to client 70a as part of a progressive download, transcoder 30 may calculate the total file size (S) in bits before progressive downloading begins or estimate S based upon target format media parameters such as the video bit rate, audio bit rate, media information size, and duration. Transcoder 30 may estimate S for Type-A files by summing the estimated size of media information 90 in the header and the estimated size of media information 90 for all the media frames in target file 82. For Type-B files, transcoder 30 may compute S using the equation:

$$S=(V \times T)+(A \times T)+M,$$

where V is the video bit rate, A is the audio bit rate, T is the duration of source file 80a and M is the sum of media information 90 in target file 82, including both the size of media information associated with the file as a whole and media information associated with individual frames of audio or video content. Transcoder 30 provides the file size, S, to content server 50 so that content server 50 can utilize this information for data flow metering.

Using the total file size, S, and the duration, T, transcoder 30 or content server 50 may then determine the minimum data rate, R, that will allow for smooth playback according to the equation: R=S÷T. In particular embodiments, content server 50 may then use the minimum data rate, R, to determine an appropriate rate at which to transmit content to client 70a.

As one example, transcoder 30 may calculate a rate of (R+α) for transmitting content to client 70a, where α is a safety margin added to compensate for data rate jitter from client 70a. In particular embodiments, content server 50 may begin transmitting content from target file 82 to client 70a with an initial setting of α=0.1×R and may adjust the value of α adaptively during transmission based on the transcoding speed of transcoder 30 and the data speed at which client 70a requests data. Client 70a may then send requests for blocks of data from target file 82 periodically at certain intervals based on a buffer length and a media playback speed associated with client 70a, and content server 50 may determine an appropriate amount of content to send client 70a based on the calculated rate. In such an embodiment, if two consecutive requests from client 70a come to content server at times t=t1 and t=t2, content server 50 calculates the total size of data to be sent to client 70a at time t=t2, as (R+α)×(t2−t1). As a result, content server 50 sends (R+α)×(t2−t1) bits of data to client 70a at t=t2. Alternatively, if client 70a sends only one request at the beginning of transmission for a single block of data with size equal to the size of target file 82, content server 50 may periodically send a packet of size N bits at an interval of (N÷(R+α)) seconds on an average basis, where N is typically less than or equal to the maximum allowable transport control protocol (TCP) packet size and the maximum allowable HTTP packet size.

In addition to data-flow metering, particular embodiments of system 10 may also utilize certain techniques to handle a dynamic rate of transcoding. Even if transcoder 30 is transcoding at real-time on average, its instantaneous performance may vary from frame to frame (e.g., faster for I-frames and slower for P-frames) or from scene to scene (e.g., slower during high motion scenes and faster during low motion scenes). To deal with this variation in transcoding speed, particular embodiments of system 10 may implement a wait-time control algorithm. In such embodiments, if a requested portion of target file 82a is not available for content server 50 to send to client 70a when requested by client 70a, then content server 50 may wait up to a predetermined or dynamically set amount of time, or "wait time," before responding. If the requested data from target file 82a is written to target file 82a by transcoder 30 within the wait time, then content server 50 sends the data to client 70a and resumes normal operation thereafter. Otherwise, if the requested data is not written to target file 82a within the wait time then at the end of the wait-time, content server 50 may send an end-of-file (EOF) to client 70a, thereby terminating the transmission session, or take other suitable remedial measures.

In particular embodiments, the wait time may be initially set based on the video frame rate and then adaptively adjusted during the session based on the request rate, data availability, performance of transcoder 30, and/or other suitable factors. For example, in particular embodiments, content server 50 may calculate a wait time value that is initially equal to one order of magnitude of the multiplicative inverse of the video frame rate, or W=10×(1÷Video Frame Rate). System 10 may then utilize this calculated wait-time value, W, as an upper bound on the amount of time content server 50 will wait for the requested information. In such embodiments, content server 50 may be designed to continually poll the file every 0.01 second, but for no longer than W seconds. Therefore as soon as the requested data from target file 82 is available, content server 50 will almost immediately retrieve and transmit the data to client 70a. If after W seconds, the requested content is not available in target file 82a, content server may then transmit an EOF or take other appropriate steps.

To facilitate use of data-flow metering, wait time values, and other aspects of the interaction between content server 50 and client 70a, transcoder 30 may communicate media information 90 and various other data to content server 50 at the beginning of transcoding or at other appropriate points before the creation of target file 82 is completed. Similarly, transcoder 30 may store other values required by specific client-side protocols or necessary to facilitate delivery to clients having certain capability limitations in a file accessible by content server 50. Thus, in particular embodiments, transcoder 30 writes three parameters—the estimated file size (S), the data rate (R), and the initial wait-time (W)—into a file that is accessible by content server 50. Content server 50 may then transmit content to client 70a or otherwise interact with client 70 based on these parameters.

Thus, by estimating file characteristics used to generate media information 90 instead of waiting until transcoding of the relevant source file 80 has been completed, particular embodiments of system 10 may permit clients 70 to initiate play back of requested source files 80 before such files have been fully transcoded. Furthermore, by writing to target files 82 in a manner determined by the media information 90 transmitted to client 70a, transcoder may ensure that client 70a is able to properly request and play content from target file 82a despite the fact that the media information 90 client 70a used to configure itself and request content was generated based on estimated characteristics of target file 82a. Additionally, by utilizing data-metering and wait-time techniques to manage the transmission of content to clients 70, particular embodiments of system 10 may reduce or eliminate unnecessary or excessive disruptions in the play back of requested content. As a result, system 10 may provide low-latency playback of media content in a variety of different formats with minimal disruptions during playback. Particular embodiments of system 10 may be especially effective in facilitating progressive download while transcoding the requested content from a Flash Video (FLV) source format to a Moving Picture Experts Group-4 target format, commonly known as MP4 file format Thus, particular embodiments of system 10 may provide numerous operational benefits. Specific embodiments, however, may provide none, some, or all of these benefits.

FIG. 2A illustrates an example media file 202 having a file structure that may be supported by particular embodiments of system 10. As discussed above, media file 202 is a type of file (referred to herein as "Type A") in which information describing the media content in media file 202 is spread throughout media file 202. Examples of Type A media files that may be supported by certain embodiments of system 10 include, but are not limited to, FLV, Audio Video Interleave (AVI), and MPEG-1 files. As shown in FIG. 2A, media information 90 for media file 202 includes header information 204 and frame information 206. Although FIG. 2A illustrates an example of a Type A file that may be supported by particular embodiments of system 10, alternative embodiments of system 10 may be capable of supporting other types of files having multiple sets of media information and/or media information located somewhere other than the beginning of the file.

FIG. 2B illustrates an example media file 212 having an alternative file structure that may be supported by particular embodiments of system 10. As discussed above, media file 212 is a type of file (referred to herein as "Type B") in which information describing the media content in media file 212 is segregated at the beginning of media file 212. Examples of Type B media files that may be supported by certain embodiments of system 10 include, but are not limited to, MP4, 3GP, and Quicktime files. As shown in FIG. 2B, media file 212 includes only a single block of media information 214 at the beginning of media file 212. Although FIG. 2B illustrates an example of a Type B file that may be supported by particular embodiments of system 10, alternative embodiments of system 10 may be capable of supporting other types of files that include a single block of media information 90 located at the beginning of the file.

Figure 3:
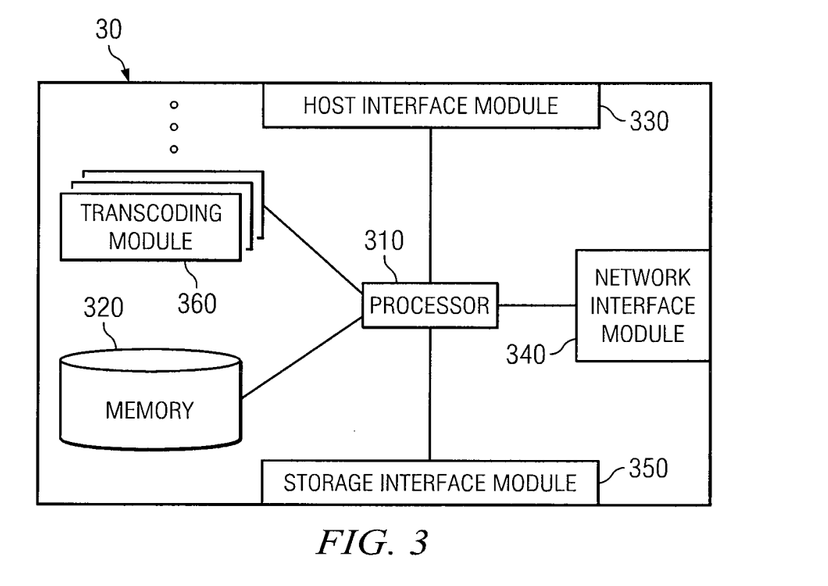
FIG. 3 is a block-diagram illustrating a transcoder that may be utilized in particular embodiments of the system.

FIG. 3 is a block diagram illustrating in greater detail the contents and operation of a particular embodiment of transcoder 30. In general, as discussed above with respect to FIG. 1, transcoder 30 retrieves or otherwise receives content for delivery to clients 70, modifies the retrieved content in an appropriate manner to create target files 82, and generates corresponding media information 90 to facilitate transmission of the modified content to the requesting client 70. As shown in FIG. 3, transcoder 30 may include a processor 310, a memory 320, a host interface module 330, a network interface module 340, a storage interface module 350, and one or more transcoding modules 360.

Processor 310 may represent or include any form of processing component, including general purpose computers, dedicated microprocessors, or other processing devices capable of processing electronic information. Examples of processor 310—include digital signal processors (DSPs), application-specific integrated circuits (ASICs), field-programmable gate arrays (FPGAs), and any other suitable specific or general purpose processors. Although FIG. 3 illustrates a particular embodiment of transcoder 30 that includes a single processor 310, transcoder 30 may, in general, include any suitable number of processors 310.

Memory 320 stores processor instructions, codecs, and/or values and parameters utilized by transcoder 30 during operation. Memory 320 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 320 may represent, in part, computer-readable media on which computer instructions are encoded. In such embodiments, some or all the described functionality of transcoder 30 may be provided by processor 310 executing the instructions encoded on the described media. Although shown in FIG. 3 as a single component, memory 320 may represent any number of memory elements within, local to, or accessible by transcoder 30.

Host interface module 330 couples transcoder 30 to host processor 40 to facilitate communication and data flow between host processor 40 and transcoder 30. For example, transcoder 30 may receive workflow 86 from host processor 40 through host interface module 330. Transcoder 30 may also use host interface module 330 to transmit messages to host processor 40 indicating that transcoder 30 has completed processing of a previously-received workflow 86 and is ready for additional assignments. In certain embodiments, communications and data flow between transcoder 30 and host processor 40 may alternatively occur via network interface module 340.

Network interface module 340 couples transcoder 30 to appropriate components of system 10 to facilitate communication over network 60 between transcoder 30 and content server 50 and/or other appropriate components of system 10 regarding content-delivery operations performed by transcoder 30. For example, transcoder 30 may utilize network interface module 340 to transmit media information 90 to content server 50. In particular embodiments, network interface module 340 includes or represents one or more network interface cards (NICs) suitable for packet-based communication over network 60.

Storage interface module 350 facilitates communication of content between transcoder 30 and various storage components of system 10. Specifically, transcoder 30 receives content from original content store 20 and communicates content to and from modified content store 22 through storage interface module 350. To support multiple simultaneous transcoding processes, storage interface module 350 may include multiple ports through which storage interface module 350 can receive/transmit multiple flows simultaneously from/to transcoded original content store 20 and/or modified content store 22.

In particular embodiments, original content store 20 and modified content store 22 are both remote from transcoder 30. As a result, in such embodiments, storage interface module 350 may represent, in part or in whole, elements of network interface module 340. In alternative embodiments, one or both of original content store 20 or modified content store 22 may represent memory components internal to transcoder 30, such as memory 320. In such embodiments, storage interface module 350 may represent, in whole or in part, a memory bus and/or other suitable components configured to communicate information between internal memory components and other components of transcoder 30.

Transcoding module(s) 360 modifies content in source files 80 from source formats to target formats suitable for transmission and playback by specific clients 70. In particular embodiments, transcoder 30 may include multiple transcoding modules 360 capable of translating, transcoding, transrating, and/or otherwise modifying various different types of content based on a target format for a received request. In certain embodiments that include multiple transcoding modules 360, transcoding modules 360 may be capable of operating concurrently so that multiple sets of content can be modified simultaneously. As one specific example, particular embodiments of transcoder 30 may contain a plurality of transcoding modules 360 with each transcoding module 360 representing or including a digital signal processor (DSP). Each DSP may have a portion of memory 320 local to that DSP in which appropriate information for encoding/decoding multiple different codecs is stored. As a result, transcoder 30 may provide a robust, power-efficient, compact platform for realtime transcoding in a high-traffic system.

In general, each of host interface module 330, network interface module 340, storage interface module 350, and transcoding module(s) 360 may represent any appropriate combination of hardware and/or software suitable to provide the described functionality. Additionally, any two or more of host interface module 330, network interface module 340, storage interface module 350, and transcoding module(s) 360 may represent or include common elements. In particular embodiments, host interface module 330, network interface module 340, storage interface module 350, and transcoding module(s) 360 represent, in part, software applications being executed by processor 310.

Figure 4:
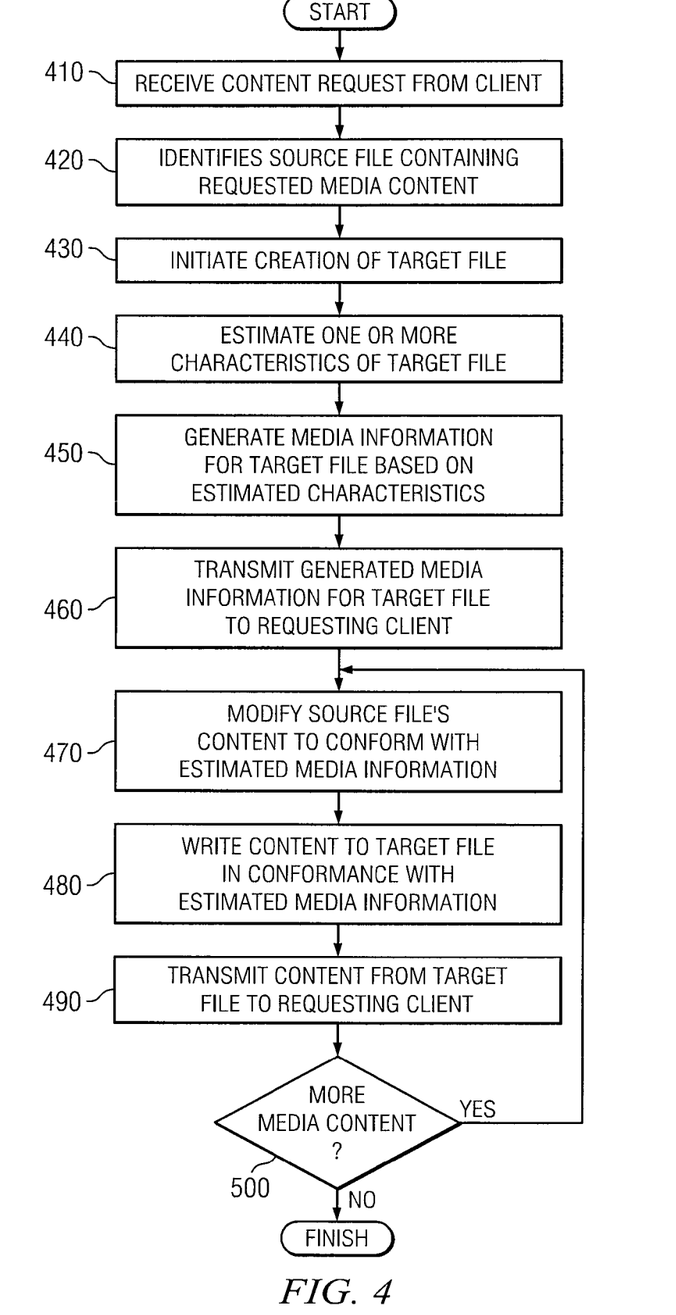
FIG. 4 is a flowchart detailing an example operation of a system for delivering media content in accordance with certain embodiments of the present invention.

FIG. 4 is a flowchart illustrating operation of a particular embodiment of system 10 in delivering content to a requesting client 70. The steps illustrated in FIG. 4 may be combined, modified, or deleted where appropriate, and additional steps may also be added to those shown. Additionally, the steps may be performed in any suitable order without departing from the scope of the invention.

Operation begins, at step 410, with content server 50 receiving a content request 84 from a particular client 70. As discussed above, content request 84 may represent any appropriate form of request suitable for the requesting client 70 to request content from content server 50. In particular embodiments, content request 84 represents an HTTP request specifying a universal resource location (URL) associated with a requested source file 80.

At step 420, content server 50 identifies a source file 80 containing media content associated with the received content request 84. The identified source file 80 has a source format that may be incompatible with or unsuitable for transmission to or playback by the requesting client 70. As a result, at step 430, content server 50 (or other appropriate components of system 10) may initiate creation of a target file 82 associated with the received content request 84. In particular embodiments, content server 50 may initiate creation of target file 82 by forwarding content request 84 to host processor 40 or directly to transcoder 30. Host processor 40 may then forward to an appropriate transcoder 30 content request 84 or a workflow created by host processor 40 in response to content request 84.

Transcoder 30 may then generate media information 90 to facilitate transmission of content from the requested source file 80 to the requesting client 70 before the corresponding target file 82 has been fully created. As part of this process, transcoder 30 estimates one or more characteristics of the target file 82 at step 440. Transcoder 30 may estimate any suitable characteristics of target file 82 including, but not limited to, a file size associated with target file 82, a frame size associated with one or more media frames to be included in target file 82, a timestamp from one or more of such media frames, and/or a location for one or more of such media frames.

At step 450, transcoder 30 then generates media information for target file 82 based on the estimated characteristics and other appropriate information associated with the relevant source file 80, its content, and/or the requesting client 70. Transcoder 30, host processor 40, content server 50, or other appropriate elements of system 10 then transmit the generated media information 90 to the requesting client 70 at step 460. For example, transcoder 30 may write the generated media information 90 to the corresponding target file 82, and content server 50 may read the relevant media information 90 from transcoded content store 22 and transmit this media information 90 to the requesting client 70. As shown by FIG. 4, in particular embodiments, the generated media information 90 may be transmitted to the requesting client 70 before creation of the corresponding target file 82 has been completed.

In the illustrated example, transcoder 30 then begins, at step 470, modifying content in source file 80 to convert this content to a target format associated with the received content request 84. Although FIG. 4 illustrates an embodiment in which transcoder 30 estimates characteristics of target file 82 before modifying any content from source file 80, in alternative embodiments, transcoder 30 may modify a portion of source file 80 and use characteristics of the modified portion as the basis for estimating characteristics of target file 82 as a whole. Thus, in particular embodiments, transcoder 30 may begin modifying at least a portion of the content in source file 80 before estimating relevant characteristics of target file 82 and/or generating media information 90 for target file 82.

In particular embodiments, transcoder 30 may modify content from source file 80 in a manner such that the modified content conforms with the media information 90 transmitted to the requesting client 70. For example, in particular embodiments, transcoder 30 may generate a media frame in the target format containing content from the requested source file 80. If the media frame is larger than an estimated frame size for the relevant type of media, transcoder 30 may discard the frame of modified content and/or alter the frame in a suitable manner to fit the estimated frame size (e.g., by writing a frame of zeros to the corresponding target file 82). Alternatively, if the media frame is smaller than an estimated frame size for the relevant type of media, transcoder 30 may discard the frame of modified content and/or alter the frame in a suitable manner to fit the estimated frame size (e.g., by padding the frame with non-data bits, such as a series of zeros, before writing the frame to the corresponding target file 82).

At step 480, transcoder 30 writes modified content from source file 80 to the corresponding target file 82. In particular embodiments, transcoder 30 may write modified content to the corresponding target file 82 based on the media information 90 transmitted to the requesting client 70. For example, transcoder 30 may write frames of modified media content to the corresponding target file 82 at locations within the relevant target file 82 specified by media information 90 transmitted to the requesting client 70.

While transcoder 30 is writing modified content to target file 82, content server 50 may transmit content from the corresponding target file 82 to the requesting client 70 at step 490. For example, in particular embodiments, content server 50 may transmit content from the relevant target file 82 to the requesting client 70 as part of a progressive download. In such embodiments, content server 50 may receive a series of requests from the requesting client 70 indicating successive portions of the relevant target file 82 that the requesting client 70 is ready to receive. Content server 50 may transmit content from the corresponding target file 82 to the requesting client 70 in response to these requests.

Transcoder 30 may continue writing modified content to the corresponding target file 82 and content server 50 may continue transmitting content from the relevant target file 82 to the requesting client 70. This process may be repeated until transcoder 30 has completed modifying and writing content from the requested source file 80 to the corresponding target file 82 and completed creation of target file 82 and/or until content server 50 has completed transmitting content from the corresponding target file 82 to the requesting client 70. Thus, transcoder 30, content server 50, and/or other appropriate elements of system 10 may determine whether more content remains to be written and/or transmitted and repeat steps 470, 480, and/or 490 as represented by step 500 in FIG. 4. If not, operation of this example embodiment of system 10 with respect to delivering the requested content may end as shown in FIG. 4.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising:
   receiving from a client a request for media content;
   identifying a first media file associated with the request, the first media file having a first media format;
   predicting or approximating, based at least in part on the first media file, one or more characteristics of a second media file, the second media file having a second media format;
   generating media information for the second media file based at least in part on the predicted or approximated characteristics of the second media file;
   initiating creation of the second media file in response to the request;
   transmitting the media information to the client before creation of the second media file has completed;
   determining that a requested portion of the second media file is not available for transmission to the client;
   determining whether the requested portion becomes available within a wait time, the wait time having a value specifying a maximum amount of time to wait;
   when the requested portion becomes available within the wait time, initiating transmission of the requested portion of the second media file to the client; and
   when the requested portion does not become available within the wait time, at the end of the wait time, sending an end-of-file (EOF) to the client terminating the transmission of the media information.

2. The method of claim 1, wherein predicting or approximating one or more characteristics of the second media file comprises calculating a frame size for each of a plurality of media frames associated with the media content.

3. The method of claim 1, wherein predicting or approximating one or more characteristics of the second media file comprises calculating a time stamp for each of a plurality of media frames associated with the media content.

4. The method of claim 1, wherein generating media information comprises determining a location in the second media file for each of a plurality of media frames in the first media file.

5. The method of claim 1, wherein generating media information comprises determining an amount of time associated with each block of content to be written to the second media file.

6. The method of claim 1, wherein generating media information comprises:
   determining an amount of time associated with each block of content to be written to the second media file; and
   determining a number of video frames in each block of video content based on the amount of time and a video frame rate associated with the second media file.

7. The method of claim 1, wherein generating media information comprises:
   determining an amount of time associated with each block of content to be written to the second media file; and
   determining a number of audio frames in each block of audio content based on the amount of time, an audio sample rate, and a number of samples per audio frame associated with the second media file.

8. The method of claim 1, further comprising writing media content to the second media file based, as least in part, on the generated media info.

9. The method of claim 8, wherein writing media content to the second media file comprises:
   generating a media frame in the second format;
   determining whether the generated media frame is larger than a predicted or approximated frame size; and
   in response to determining that the generated media frame is larger than the predicted or approximated frame size, discarding the generated media frame.

10. The method of claim 8, wherein writing media content to the media file comprises:
    generating a media frame in the second format;
    determining whether the generated media frame is smaller than a predicted or approximated frame size; and
    in response to determining that the generated media frame is smaller than the predicted or approximated frame size, adding dummy bits to the generated media frame.

11. The method of claim 1, further comprising transmitting a portion of the second media file to the client before creation of the second media file has been completed.

12. The method of claim 11, wherein transmitting the portion of the second media file to the client comprises transmitting the portion to the client as part of a progressive download of the second media file.

13. The method of claim 11, further comprising initiating, at the client, playback of the portion of the second media file before creation of the second media file has been completed.

14. The method of claim 1, wherein predicting or approximating one or more characteristics of the second media file comprises predicting or approximating one or more characteristics of the second media file before any media content is written to the second file.

15. The method of claim 1, wherein predicting or approximating one or more characteristics of the second media file comprises:
- generating one or more media frames in the second format based, at least in part, on the first media file; and
- predicting or approximating the one or more characteristics of the second media file based on the generated media frames.

16. An apparatus comprising:
one or more hardware processors;
one or more non-transitory, computer-readable media storing instructions operable, when executed by the one or more processors, to:
- receive from a client a request for media content;
- identify a first media file associated with the request, the first media file having a first media format;
- predict or approximate, based at least in part on the first media file, one or more characteristics of a second media file, the second media file having a second media format;
- generate media information for the second media file based at least in part on the predicted or approximated characteristics of the second media file;
- initiate creation of the second media file in response to the request;
- transmit the media information to the client before creation of the second media file has been completed;
- determine that a requested portion of the second media file is not available for transmission to the client;
- determine whether the requested portion becomes available within a wait time, the wait time having a value specifying a maximum amount of time to wait;
- when the requested portion becomes available within the wait time, initiate transmission of the requested portion of the second media file to the client, and
- when the requested portion does not become available within the wait time, at the end of the wait time, sending an end-of-file (EOF) to the client terminating the transmission of the media information.

17. The apparatus of claim 16, wherein the processor is operable to predict or approximate one or more characteristics of the second media file by calculating a frame size for each of a plurality of media frames associated with the media content.

18. The apparatus of claim 16, wherein the processor is operable to predict or approximate one or more characteristics of the second media file by calculating a time stamp for each of a plurality of media frames associated with the media content.

19. The apparatus of claim 16, wherein the processor is operable to predict or approximate one or more characteristics of the second media file by determining a location in the second media file for each of a plurality of media frames in the first media file.

20. The apparatus of claim 16, wherein the processor is operable to generate the media information by determining an amount of time associated with each block of content to be written to the second media file.

21. The apparatus of claim 16, wherein the processor is operable to generate media information by:
- determining an amount of time associated with each block of content to be written to the second media file; and
- determining a number of video frames each block of video content based on the amount of time and a video frame rate associated with the second media file.

22. The apparatus of claim 16, wherein the processor is operable to generate media information by:
- determining an amount of time associated with each block of content to be written to the second media file; and
- determining a number of audio frames in each block of audio content based on the amount of time, an audio sample rate, and a number of samples per audio frame associated with the second media file.

23. The apparatus of claim 16, wherein the processor is further operable to write media content to the second media file based, at least in part, on the generated media information.

24. The apparatus of claim 23, wherein the processor is operable to write media content to the second media file by:
- generating a media frame in the second format;
- determining whether the generated media frame is larger than a predicted or approximated frame size; and
- in response to determining that the generated media frame is larger than the predicted or approximated frame size, discarding the generated media frame.

25. The apparatus of claim 23, wherein the processor is operable to write media content to the second media file by:
- generating a media frame in the second format;
- determining whether the generated media frame is smaller than a predicted or approximated frame size; and
- in response to determining that the generated media frame is smaller than the predicted or approximated frame size, adding dummy bits to the generated media frame.

26. The apparatus of claim 16, wherein the processor is further operable to transmit a portion of the second media file to the client before creation of the second media file has been completed.

27. The apparatus of claim 26, wherein the processor is operable to transmit the portion of the second media file to the client by transmitting the portion to the client as part of a progressive download of the second media file.

28. The apparatus of claim 16, wherein the processor is operable to predict or approximate one or more characteristics of the second media file by predicting or approximating one or more characteristics of the second media file before any media content is written to the second file.

29. The apparatus of claim 16, wherein the processor is operable to predict or approximate one or more characteristics of the second media file by:
- generating one or more media frames in the second format based, at least in part, on the first media file; and
- predicting or approximating the one or more characteristics of the second media file based on the generated media frames.

30. A transcoder comprising:
one or more hardware processors;
one or more non-transitory computer-readable media storing instructions operable, when executed by the one or more processors, to:

receive from a client a request for media content;
identify a first media file associated with the request, the first media file having a first media format;
predict or approximate, based at least in part on the first media file, one or more characteristics of a second media file, the second media file having a second media format;
generate media information for the second media file based at least in part on the predicted or approximated characteristics of the second media file;
initiate creation of the second media fi in response to the request;
transmit the media information to the client before creation of the second media file has completed;
determine that a requested portion of the second media file is not available for transmission to the client;
determine whether the requested portion becomes available within a wait time, the wait time having a value specifying a maximum amount of time to wait;
when the requested portion become available within the wait time, initiate transmission of the requested portion of the second media file to the client, and
when the requested portion does not become available within the wait time, at the end of the wait time, sending an end-of-file (EOF) to the client terminating the transmission of the media information.

* * * * *